(12) United States Patent
Park

(10) Patent No.: US 6,801,511 B2
(45) Date of Patent: Oct. 5, 2004

(54) APPARATUS AND METHOD FOR PERFORMING HANDOFF IN A MOBILE COMMUNICATION SYSTEM

(75) Inventor: Ji-Hoon Park, Songnam-shi (KR)

(73) Assignee: Samsung Electronics Co., Ltd. (KR)

(*) Notice: Subject to any disclaimer, the term of this patent is extended or adjusted under 35 U.S.C. 154(b) by 792 days.

(21) Appl. No.: 09/741,964

(22) Filed: Dec. 21, 2000

(65) Prior Publication Data

US 2001/0006514 A1 Jul. 5, 2001

(30) Foreign Application Priority Data

Dec. 30, 1999 (KR) .......................................... 1999-67038

(51) Int. Cl.[7] .................................................. H04Q 7/00
(52) U.S. Cl. .................................... 370/331; 455/441
(58) Field of Search ................................ 370/328, 329, 370/331, 332; 455/432.1, 436, 438, 442, 443, 441; 342/104, 105, 106, 107, 108, 109, 110, 111, 112, 113, 114, 115, 116, 117

(56) References Cited

U.S. PATENT DOCUMENTS

| | | | | |
|---|---|---|---|---|
| 5,787,348 A | * | 7/1998 | Willey et al. | 455/441 |
| 6,052,598 A | * | 4/2000 | Rudrapatna et al. | 455/456.1 |
| 6,061,337 A | * | 5/2000 | Light et al. | 370/331 |
| 6,064,691 A | * | 5/2000 | Banister et al. | 375/149 |
| 6,085,091 A | * | 7/2000 | Yoo et al. | 455/441 |
| 6,138,021 A | * | 10/2000 | Arrington et al. | 455/436 |
| 6,317,453 B1 | * | 11/2001 | Chang | 375/140 |
| 6,490,460 B1 | * | 12/2002 | Soliman | 455/522 |
| 6,496,493 B1 | * | 12/2002 | Chung | 370/332 |
| 6,507,740 B2 | * | 1/2003 | Shi | 455/437 |
| 6,519,237 B1 | * | 2/2003 | McDonough et al. | 370/335 |
| 6,529,733 B1 | * | 3/2003 | Qing-An | 455/437 |
| 6,668,010 B1 | * | 12/2003 | Minematsu | 375/145 |
| 6,714,785 B1 | * | 3/2004 | Han | 455/440 |
| 2002/0102977 A1 | * | 8/2002 | Shi | 455/437 |
| 2004/0085938 A1 | * | 5/2004 | Tiedemann et al. | 370/335 |

* cited by examiner

Primary Examiner—Seema S. Rao
Assistant Examiner—Michael J. Moore, Jr.
(74) Attorney, Agent, or Firm—Dilworth & Barrese LLP

(57) ABSTRACT

An apparatus performs a handoff considering a moving speed of a mobile station in a mobile communication system. A searcher calculates energy of every PN phase in a given search window and reports a detected PN phase to a controller. The controller then determines a moving direction and a moving speed of a mobile station depending on the detected PN phase and a previously detected PN phase, and adaptively determines a pilot received strength threshold used to perform a handoff depending on the determined moving direction and moving speed of the mobile station.

14 Claims, 6 Drawing Sheets

APPARATUS AND METHOD FOR PERFORMING HANDOFF IN A MOBILE COMMUNICATION SYSTEM

PRIORITY

This application claims priority to an application entitled "Apparatus and Method for Performing Handoff in a Mobile Communication System" filed in the Korean Industrial Property Office on Dec. 30, 1999 and assigned Serial No. 99-67038, the contents of which are hereby incorporated by reference.

BACKGROUND OF THE INVENTION

1. Field of the Invention

The present invention relates generally to a mobile communication system, and in particular, to an apparatus and method for performing a handoff considering a moving speed of a mobile station.

2. Description of the Related Art

In general, a mobile communication system divides a radio network into small areas, called "cells", in order to efficiently manage the frequency resources, and a mobile station (MS) is provided with a service from a base station (BS) in a cell to which it belongs. Meanwhile, when the mobile station moves from a serving cell to another cell, a handoff is performed on the mobile station to maintain the service.

As stated above, in the mobile communication system, the handoff is performed in order to maintain communication even when the mobile station moves between the cells. There have been proposed two handoff methods: one is a soft handoff and another is a hard handoff. The soft handoff performs the service through the channel allocated by a handoff target (or neighbor) base station and the channel allocated by the serving base station, and releases the channel from the serving base station when a channel quality of the serving base station drops below a predetermined threshold. On the contrary, the hard handoff releases the channel from the serving base station and allocates to the mobile station a channel from a neighbor base station, when the channel quality of the serving base station drops below a predetermined threshold during a call.

FIG. 1 shows the overall configuration of a mobile communication system. Referring to FIG. 1, mobile stations 111–11n communicate with their associated base stations 121–12n, which are controlled by one base station controller (BSC) 131. Base station controllers 131–13n are controlled by one mobile switching center (MSC) 141. If the mobile station 111 attempts communication with a wire subscriber 161 of a public switched telephone network (PSTN) 151 through the radio network (comprised of BS, BSC and MSC), the mobile switching center 141 connects the mobile station 111 to the wire subscriber 161 through the PSTN 151 to establish a traffic channel.

FIG. 2 shows a change in strength of the signals received from a serving base station BS1 and a neighbor base station BS2, when the mobile station moves from a position 'a' to a position 'b' in an overlapped area (OL) where a service area CELL1 of the serving base station BS1 overlaps with a service area CELL2 of the neighbor base station BS2.

A conventional soft handoff operation will be described below with reference to FIG. 2. In the following description, it will be assumed that the mobile station being provided with the service from the serving base station BS1 moves toward the cell area CELL2 of the neighbor base station BS2.

The soft handoff occurs under the control of the base station controller, when the mobile station is located in the overlapped area OL where the service area CELL1 of the BS1 overlaps with the service area CELL2 of the BS2. That is, upon detecting received strength, from the BS2, corresponding to a predetermined handoff add threshold T_add while moving toward the BS2, the mobile station being serviced by the BS1 sends the detected strength to the base station controller. Upon receipt of the detected strength, the base station controller determines whether the BS2 is available. If the BS2 is available, the base station controller allocates a channel between the BS2 and the mobile station. When the channel is allocated to the BS2, the BS1 and the BS2 provide the mobile station with the service through their allocated channels. Meanwhile, as the mobile station moves toward the BS2, the mobile station will detect the signal strength received from the BS1 dropping below a predetermined handoff drop threshold T_drop. In this case, the mobile station drops the present serving base station BS1 and is provided with the service from only the BS2. Here, the mobile station drops the BS1 after a lapse of a guard time T_Tdrop from the time point when the signal strength received from the BS1 drops below the handoff drop threshold T_drop. That is, the mobile station drops the BS1 only when the signal strength dropped below T_drop is maintained for the guard time T_Tdrop, so as to prevent occurrence of the handoff even when the signal strength is instantaneously dropped below the handoff drop threshold T_drop.

However, this method equally performs the handoff on the mobile station moving at high speed and the mobile station moving at low speed, without considering the moving speed of the mobile station. In this case, the mobile station moving at high speed passes the handoff area very fast, so that the call may be dropped. On the contrary, the mobile station moving at low speed may perform an unnecessary handoff.

SUMMARY OF THE INVENTION

It is therefore an object of the present invention to provide a handoff apparatus and method in which a mobile station determines its moving direction and moving speed by measuring a change in a PN phase of a specific pilot and performs a handoff depending on the determined information.

It is another object of the present invention to provide an apparatus and method for increasing a handoff start threshold when the mobile station slowly approaches a handoff target base station, so as to perform a handoff at a later time.

It is further another object of the present invention to provide an apparatus and method for decreasing the handoff start threshold when the mobile station quickly approaches the handoff target base station, so as to perform the handoff at an earlier time.

It is yet another object of the present invention to provide a handoff apparatus and method for adaptively adjusting a received strength threshold of a pilot signal in consideration of a moving speed of the mobile station in a mobile communication system.

To achieve the above and other objects, there is provided an apparatus for performing a handoff in a mobile communication system. A searcher calculates energy of every PN phase in a given search window and reports a detected PN phase to a controller. The controller then determines a moving direction and a moving speed of a mobile station depending on the detected PN phase and a previously detected PN phase, and adaptively determines a pilot received strength threshold used to perform a handoff depending on the determined moving direction and moving speed of the mobile station.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The term "handoff end threshold" as used herein refers to a received strength threshold of a pilot signal, referring to which the mobile station requests a handoff by measuring a signal from the serving base station. Further, the term "handoff start threshold" refers to a received strength threshold of a pilot signal, referring to which the mobile station requests a handoff by measuring a signal from a neighbor base station.

Commonly, in a mobile station, a searcher acquires synchronization with the base station and measures pilot signal strength of the neighbor base station. The embodiment of the present invention predicts a moving direction and a moving speed of the mobile station by using the searcher. Further, the embodiment adaptively adjusts the received strength threshold of the pilot signal (from the neighbor base station) according to the moving speed. In general, the mobile station measures the received strength of the pilot signals from the neighbor base stations, and when the measured strength exceeds (or becomes lower than) a threshold, the mobile station reports this to the base station so that the base station can determine the handoff. However, when the mobile station moves at a high speed, the mobile station moves out of the handoff area before it gives a report, so that the handoff cannot be performed correctly. The embodiment of the present invention, however, decreases the threshold when the mobile station moves at high speed, to make it possible to give a report at an earlier time, so that the handoff can be performed properly. In addition, when the mobile station moves at slow speed, the embodiment increases the threshold to prevent the handoff from occurring too frequently, thereby performing the handoff at a proper time.

In the mobile communication system, the major function of the searcher is to acquire a PN code generated from the base station in the cell where the mobile station is located, and to search a PN code generated in the neighbor base station for handoff. In the embodiment of the present invention, the moving speed of the mobile station is calculated based on a time required for the PN phase change through search of the neighbor base station.

Figure 1:
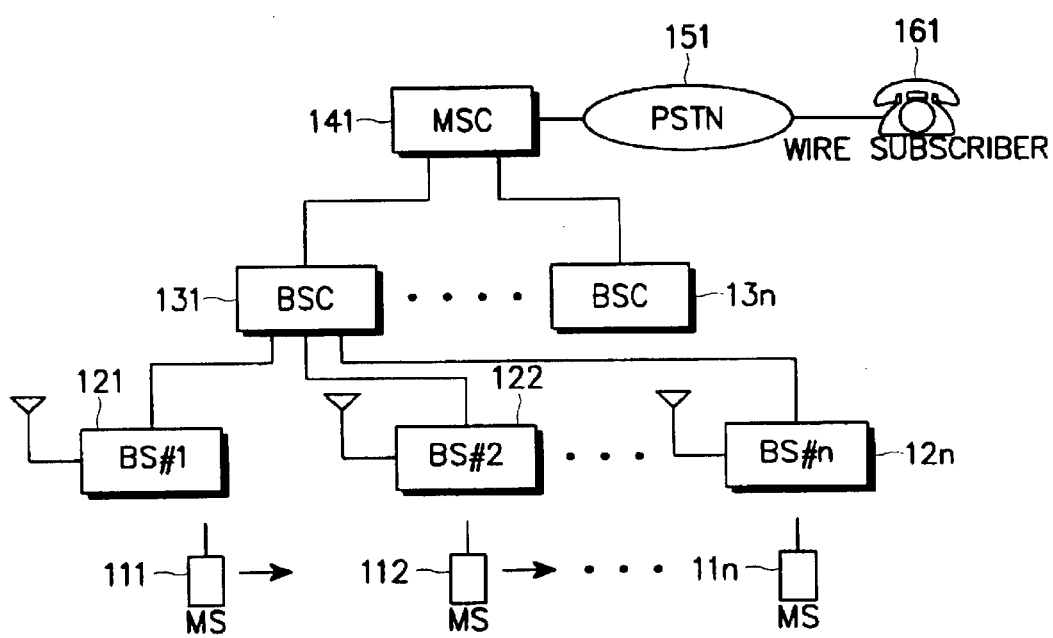
FIG. 1 is a system diagram illustrating a mobile communication system.
Figure 2:
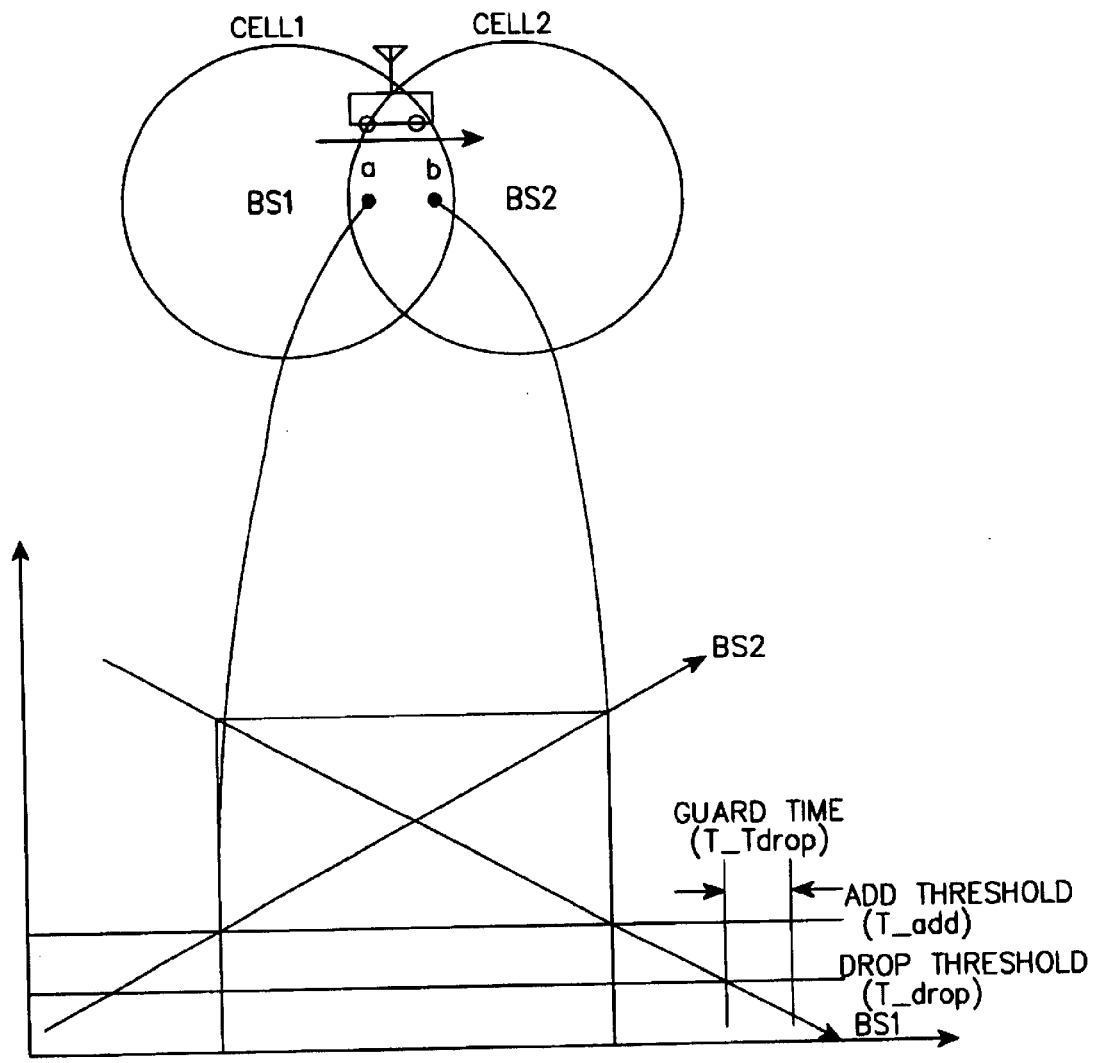
FIG. 2 is a diagram for explaining a handoff operation performed in a conventional mobile communication system.
Figure 3:
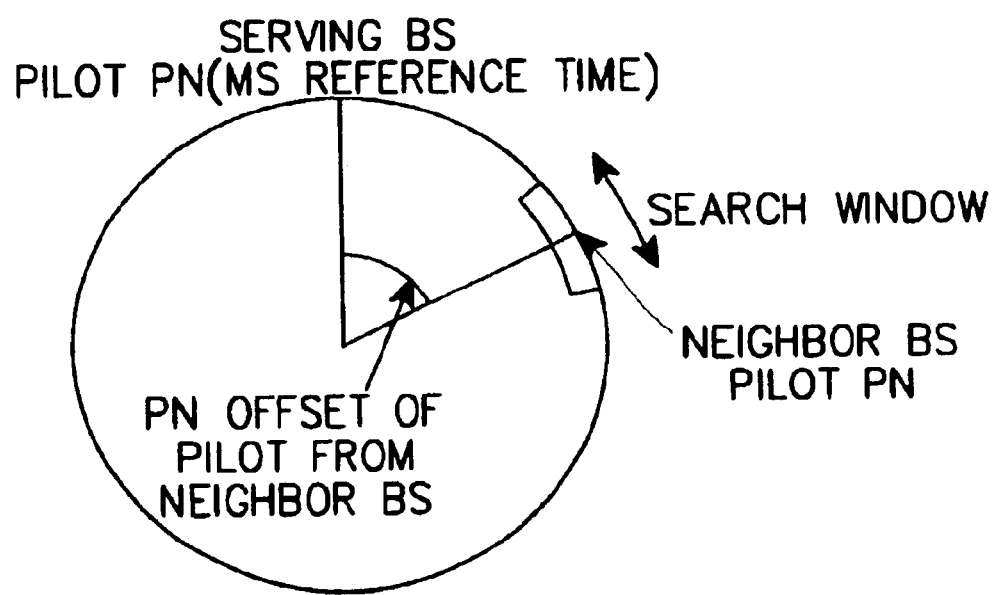
FIG. 3 is a diagram for explaining a method for determining a search interval of a neighbor base station, centering around a reference time of the mobile station.

FIG. 3 shows a phase for a PN period of a PN generator. The searcher acquires synchronization with the serving base station through acquisition of a PN code, and then, acquires system time information through a sync channel message received from the serving base station. The mobile station synchronizes a mobile station time to a 80 ms sync signal at which time the paging and traffic channel messages start, based on the system time information. The synchronized time becomes a reference time of the mobile station. Based on the reference time, the mobile station can search a desired pilot signal from the base station by applying to the PN generator a mask with a pilot offset allocated to the respective base stations, when searching the serving base station and the neighbor base station. Here, the mobile station is provided with the PN offset of the adjacent base stations from the serving base station.

Therefore, it is possible to calculate a relative distance between the mobile station and the present serving base station and between the mobile station and the neighbor base station, based on the pilot signal received at the mobile station from the neighbor base station. The pilot signal from the neighbor base station is viewed through a search window set to search the neighbor base station. In addition, when the mobile station searches the signal from the neighbor base station, the center of the search window is coincident with a signal arrival time from the serving base station, obtained by searching the serving base station. If the distance between the mobile station and the neighbor base station becomes almost equal to the distance between the mobile station and the present serving base station, a PN phase of the neighbor base station will be detected at the center of the search window opened for the mobile station to search the neighbor base station. However, if the PN phase is detected after passage through the center of the search window, it means that the distance between the mobile station and the neighbor base station is relatively longer than the distance between the mobile station and the serving base station. Otherwise, if the PN phase is detected before passage through the center of the search window, it means that the distance between the mobile station and the neighbor base station is relatively shorter than the distance between the mobile station and the serving base station.

Figure 4:
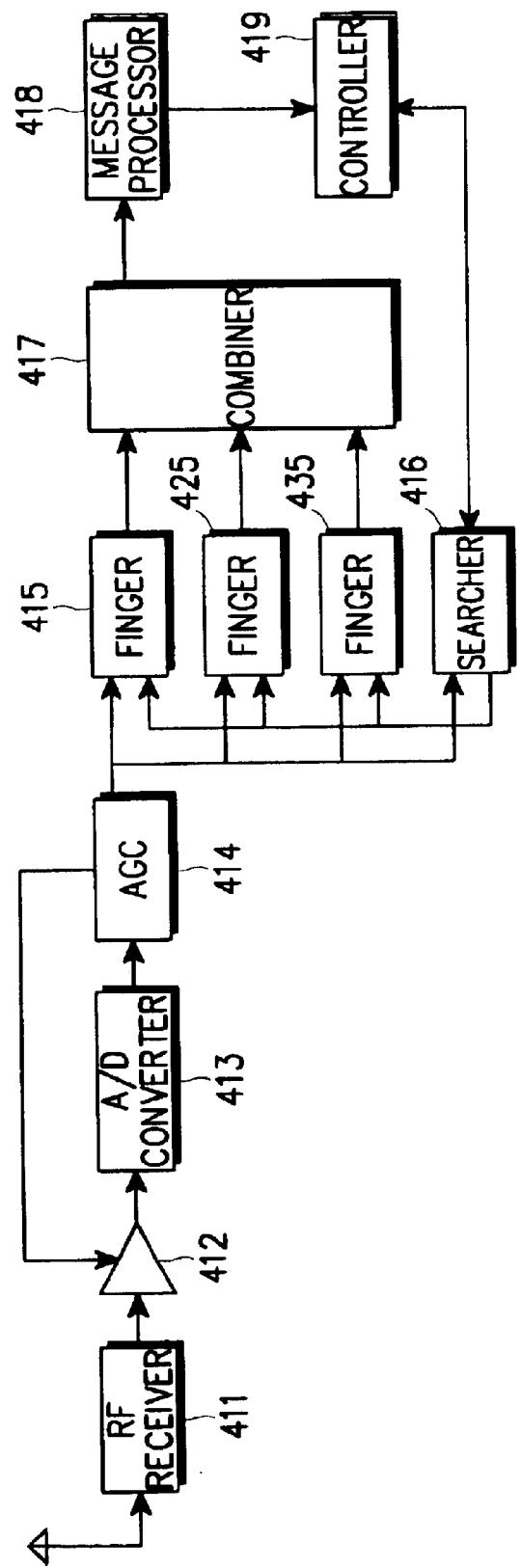
FIG. 4 is a block diagram illustrating a mobile station receiver according to an embodiment of the present invention.

FIG. 4 shows a mobile station receiver according to an embodiment of the present invention. Referring to FIG. 4, an RF (Radio Frequency) receiver 411 down-converts a radio signal received through an antenna into an IF (Intermediate Frequency) signal, and converts again the IF signal into a baseband signal. An amplifier 412, under the control of an automatic gain controller (AGC) 414, amplifies an output signal of the RF receiver 411 to be matched with a dynamic range of an analog-to-digital (A/D) converter 413. The A/D converter 413 converts an output signal of the amplifier 412 to a digital signal through sampling and quantization. The automatic gain controller 414 controls a gain of the amplifier 412 so as to maintain the output signal range of the amplifier 412 at a certain level. Fingers 415, 425 and 435 receive their associated phase signals and despread the received signals. A searcher 416 searches the received signals while changing the phase in the search interval and provides the measured phase value to the fingers 415, 425 and 435. In particular, the searcher 416, under the control of a controller 419, searches the neighbor base station (or the serving base station) and reports the detected PN phase to the controller 419. A combiner 417 combines the signals output from the fingers 415, 425 and 435. A message processor (or demodulator) 418 restores the signal output from the combiner 417 to its original data by decoding. At this point, control message data is provided to the controller 419. The controller 419 receives the restored message data from the message processor 418 and controls the overall operation according to the received message data. Particularly, when the searcher 416 reports the change of PN phase, the controller 419 adjusts a handoff start (or handoff end) threshold by calculating a changing time and then calculating a moving speed of the mobile station depending on the changing time. The mobile station reports to the base station the received strength of the pilot signals from the neighbor base stations based on the adjusted threshold. Here, since it is possible to know a moving distance from the change of the PN phase and also know the time required for the change of the PN phase, the controller 419 can calculate the moving speed.

Figure 5:
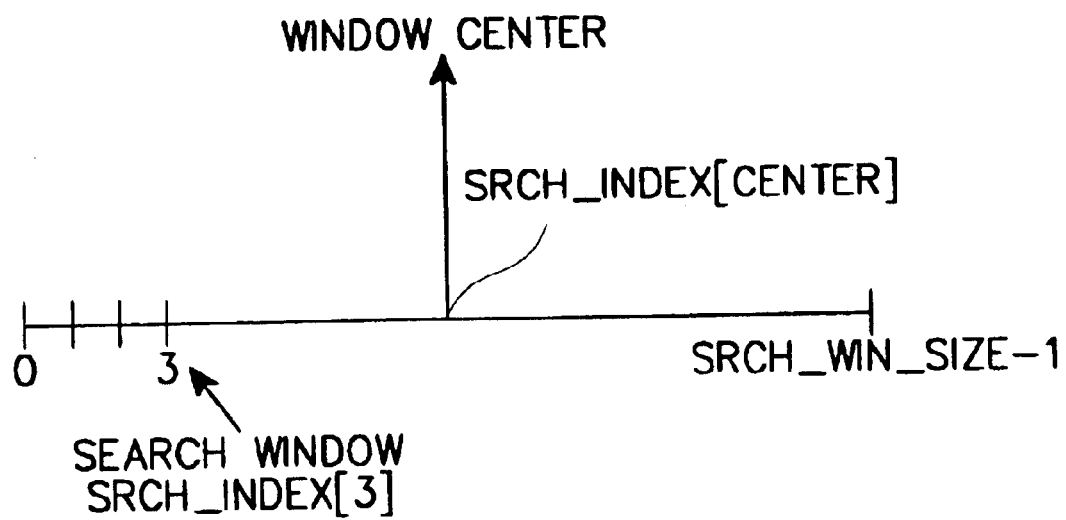
FIG. 5 is a diagram illustrating a search window including a PN phase to be searched.

FIG. 5 shows a structure of the search window including a PN phase to be searched. For example, if the shown search window is for the neighbor base station, a unique search window index srch_index[i] is assigned to each PN phase within the search window interval, and the center of the search window is assigned a search window index srch_index[Center] including a PN phase offset of the neighbor base station. If the distance between the mobile station and the neighbor base station becomes almost equal to the distance between the mobile station and the present serving base station, a PN phase of the neighbor base station will be detected at the center of the search window opened for the mobile station to search the neighbor base station. However, if the PN phase is detected after passage through the center of the search window, it means that the distance between the mobile station and the neighbor base station is relatively longer than the distance between the mobile station and the serving base station. If the PN phase is detected before passage through the center of the search window, it means that the distance between the mobile station and the neighbor base station is relatively shorter than the distance between the mobile station and the serving base station. The embodiment of the present invention calculates a moving speed of the mobile station from the changing time upon detecting a change of the PN phase while searching the neighbor base stations, and adaptively adjusts the handoff start threshold according to the moving speed, thereby to perform the handoff at an appropriate time.

Figure 6:
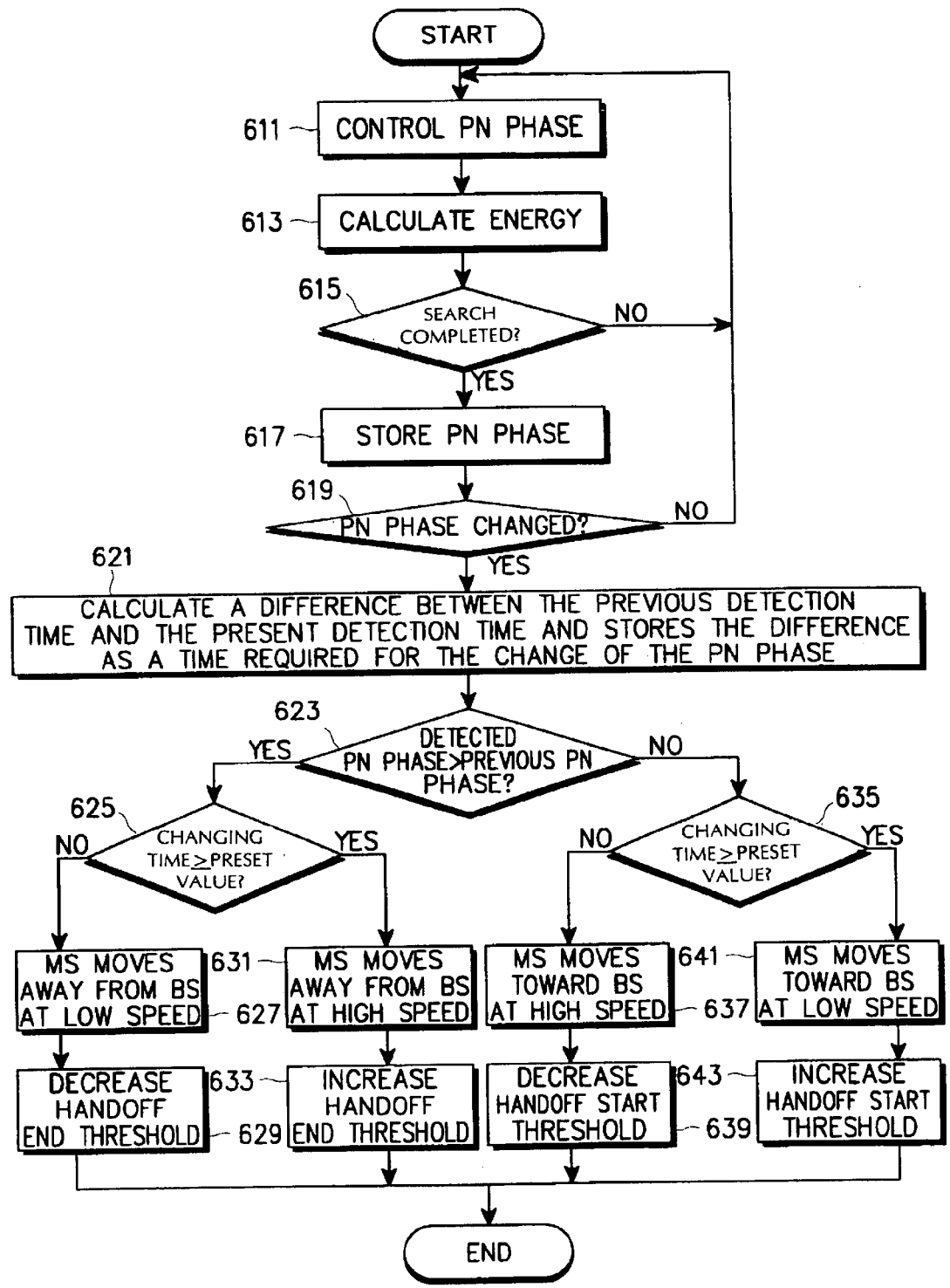
FIG. 6 is a flow chart illustrating a procedure for determining a handoff considering a moving speed of the mobile station according to an embodiment of the present invention.

FIG. 6 shows a procedure for performing a handoff considering a moving speed of the mobile station according to an embodiment of the present invention.

Referring to FIG. 6, in step 611, the mobile station detects a received signal by controlling a PN phase corresponding to the search window, a center of which corresponds to a PN phase of a specific base station. Then, the mobile station calculates an energy value of the detected signal in step 613, and determines in step 615 whether the search has been performed on every PN phase of the search window. That is, the mobile station determines whether signal detection for the last PN phase of the search window has been completed. If the search has been performed on every PN phase, the mobile station proceeds to step 617. Otherwise, if there remain PN phases not yet searched, the mobile station returns to step 611 to control the next PN phase. In step 617, the mobile station stores the detected PN phase. Thereafter, the mobile station determines in step 619 whether the PN phase is changed from the previously detected PN phase. If there is a change in the PN phase, the mobile station in step 621 calculates a difference between the previous detection time and the present detection time and stores the difference as a time required for the change of the PN phase (hereinafter, referred to as "changing time"). If the PN phase has not changed, the process returns to step 611 to control the next PN phase.

Thereafter, the mobile station determines in step 623 whether the detected PN phase is greater than the previously detected PN phase. That is, the mobile station determines whether the presently detected PN phase is located in the left side of the previously detected PN phase in the search window of FIG. 5. If the detected PN phase is greater than the previously detected PN phase, the mobile station process proceeds to step 625, and otherwise, the process proceeds to step 635.

In step 625, the mobile station determines whether the changing time is greater than or equal to a preset value. If the changing time is greater than or equal to the preset value, the mobile station sets, in step 631, a value indicating that the mobile station is moving away from the base station corresponding to the search window at high speed, and then, increases the handoff end threshold in step 633. When the handoff end threshold is increased, the handoff is performed at the earlier time.

When the changing time is less than the preset value as determined in step 625, the mobile station sets, in step 627, a value indicating that the mobile station is moving away from the base station corresponding to the search window at low speed, and then, decreases the handoff end threshold in step 629. When the handoff end threshold is decreased, the handoff is performed at the later time.

However, when the detected PN phase is less than the previously detected PN phase in step 623, the mobile station determines in step 635 whether the changing time is greater than a preset value. If the changing time is greater than the preset value, the mobile station sets, in step 641, a value indicating that the mobile station is moving toward the base station corresponding to the search window at low speed, and then, increases the handoff start threshold in step 643. When the handoff start threshold is increased, the handoff is performed at the later time.

Meanwhile, if the changing time is less than the preset time as determined in step 635, the mobile station sets, in step 637, a value indicating that the mobile station is moving toward the base station corresponding to the search window at high speed, and then, decreases the handoff start threshold in step 639. When the handoff start threshold is decreased, the handoff is performed at the earlier time.

As mentioned above, the handoff end threshold and the handoff start threshold directly affect the time point when the handoff is performed. For example, when the mobile station monitors the pilot signal from the serving base station and the handoff end threshold is decreased, the mobile station sends a handoff request to the serving base station at the later time. Otherwise, if the handoff end threshold is increased, the mobile station sends a handoff request to the serving base station at the earlier time. When the mobile station monitors the pilot signal from the neighbor base station and the handoff start threshold is decreased, the mobile station sends a handoff request to the serving base station at the earlier time. Otherwise, if the handoff start threshold is increased, the mobile station sends a handoff request to the serving base station at the later time. As a result, the embodiment of the present invention adaptively adjusts the handoff time considering the moving direction and the moving speed of the mobile station.

In the meantime, when the mobile station moves along a cell boundary, the pilot PN phases of the two neighboring base stations increase very slowly. That is, the handoff end threshold for the pilot from the serving base station is decreased, and the handoff start threshold for the pilot from the neighbor base station is increased, so that the handoff is not performed.

As described above, the mobile communication system according to the present invention performs a handoff considering the moving direction and the moving speed of the mobile station as well as the received strength of the pilot signal, thereby making it possible to perform the handoff at an appropriate time. That is, for the mobile station moving at high speed, the handoff is performed at the earlier time. However, for the mobile station moving at low speed or moving at the circumference of the cell, the handoff is performed at the later time or not performed, thereby avoiding unnecessary handoff. As a result, it is possible to increase the performance of the mobile station and reduce the system load. In particular, it is possible to prevent the performance degradation due to the hard handoff by applying the invention to the hard handoff area in the CDMA system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for performing a handoff in a mobile communication system, comprising:
   a searcher for calculating energy of every PN phase in a given search window and reporting a detected PN phase to a controller; and
   said controller for determining a moving direction and a moving speed of a mobile station depending on the detected PN phase and a previously detected PN phase, and determining a pilot received strength threshold used to perform a handoff depending on the determined moving direction and moving speed of the mobile station.

2. The apparatus as claimed in claim 1, wherein the search window is formed to have a center index which is a search window index obtained by applying a mask with a PN phase offset of a neighboring base station to a reference time synchronized to a serving base station.

3. The apparatus as claimed in claim 1, wherein the moving speed is calculated from a moving distance calculated from a change in the PN phase and a changing time required for the change in the PN phase.

4. The apparatus as claimed in claim 1, wherein when the detected PN phase is greater than the previously detected PN phase and the changing time required for the change in the PN phase is less than a preset value, the controller determines that a mobile station moves away from a specific base station at low speed, and then, decreases a pilot received strength threshold of the specific base station used to end the handoff.

5. The apparatus as claimed in claim 1, wherein when the detected PN phase is greater than the previously detected PN phase and the changing time required for the change in the PN phase is greater than a preset value, the controller determines that a mobile station moves away from a specific base station at high speed, and increases a pilot received strength threshold of the specific base station used to end the handoff.

6. The apparatus as claimed in claim 1, wherein when the detected PN phase is less than the previously detected PN phase and the changing time required for the change in the PN phase is less than a preset value, the controller determines that a mobile station moves toward a specific base station at high speed, and decreases a pilot received strength threshold of the specific base station used to start the handoff.

7. The apparatus as claimed in claim 1, wherein when the detected PN phase is less than the previously detected PN phase and the changing time required for the change in the PN phase is greater than a preset value, the controller determines that a mobile station moves toward a specific base station at low speed, and increases a pilot received strength threshold of the specific base station used to start the handoff.

8. A method for performing a handoff in a mobile communication system, comprising the steps of:
   calculating energy of every PN phase in a given search window and detecting a PN phase; and
   determining a moving direction and a moving speed of a mobile station depending on the detected PN phase and a previously detected PN phase; and
   determining a pilot received strength threshold used to perform a handoff depending on the determined moving direction and moving speed of the mobile station.

9. The method as claimed in claim 8, wherein the search window is formed to have a center index which is a search window index obtained by applying a mask with a PN phase offset of a neighbor base station to a reference time synchronized to a serving base station.

10. The method as claimed in claim 8, wherein the moving speed is calculated from a moving distance calculated from a change in the PN phase and a changing time required for the change in the PN phase.

11. The method as claimed in claim 8, wherein when the detected PN phase is greater than the previously detected PN phase and the changing time required for the change in the PN phase is less than a preset value, it is determined that a mobile station moves away from a specific base station at low speed, and a pilot received strength threshold of the specific base station used to end the handoff is decreased.

12. The method as claimed in claim 8, wherein when the detected PN phase is greater than the previously detected PN phase and the changing time required for the change in the PN phase is greater than a preset value, it is determined that a mobile station moves away from a specific base station at high speed, and a pilot received strength threshold of the specific base station used to end the handoff is increased.

13. The method as claimed in claim 8, wherein when the detected PN phase is less than the previously detected PN phase and the changing time required for the change in the PN phase is less than a preset value, it is determined that a mobile station moves toward a specific base station at high speed, and a pilot received strength threshold of the specific base station used to start the handoff is decreased.

14. The method as claimed in claim 8, wherein when the detected PN phase is less than the previously detected PN phase and the changing time required for the change in the PN phase is greater than a preset value, it is determined that a mobile station moves toward a specific base station at low speed, and a pilot received strength threshold of the specific base station used to start the handoff is increased.

* * * * *